US012220797B2

(12) United States Patent
Meyer et al.

(10) Patent No.: US 12,220,797 B2
(45) Date of Patent: Feb. 11, 2025

(54) SINGLE MOTION MAGAZINE RETENTION FOR FASTENING TOOLS

(71) Applicant: Black & Decker, Inc., New Britain, CT (US)

(72) Inventors: Jeffrey J. Meyer, Baltimore, MD (US); Stuart E. Garber, Towson, MD (US)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 17/582,373

(22) Filed: Jan. 24, 2022

(65) Prior Publication Data

US 2022/0143796 A1 May 12, 2022

Related U.S. Application Data

(63) Continuation of application No. 15/196,175, filed on Jun. 29, 2016, now Pat. No. 11,267,114.

(51) Int. Cl.
*B25C 1/00* (2006.01)
*B25C 1/06* (2006.01)

(52) U.S. Cl.
CPC .............. *B25C 1/001* (2013.01); *B25C 1/005* (2013.01); *B25C 1/06* (2013.01)

(58) Field of Classification Search
CPC ............ B25C 1/001; B25C 1/005; F41A 9/24
See application file for complete search history.

(56) References Cited

U.S. PATENT DOCUMENTS

2008/0283568 A1* 11/2008 Nayrac .................. B25C 1/184 227/120

* cited by examiner

*Primary Examiner* — Daniel Jeremy Leeds
(74) *Attorney, Agent, or Firm* — Rhonda Barton

(57) ABSTRACT

A fastening tool including a magazine securely and releasably retained on the fastening tool by a cam mounted on one of the fastening tool and the magazine. In a single rotary motion, the cam wedges together the housing member of the fastening tool and the housing member of the magazine, while simultaneously rotating cam lobes into respective chambers formed on the fastening tool and the magazine. The cam rotation and magazine retention system is accomplished without tools.

4 Claims, 17 Drawing Sheets

SINGLE MOTION MAGAZINE RETENTION FOR FASTENING TOOLS

The present application is a continuation of co-pending U.S. patent application Ser. No. 15/196,175 filed Jun. 29, 2016, entitled "Single Motion Magazine Retention for Fastening Tools", which is incorporated herein by reference.

BACKGROUND OF THE INVENTION

Field of the Invention

Description of the Related Art

Fastening tools, such as concrete nailers, staplers, and other nailers, are normally provided with fastener magazines. Although the magazines are useful for supplying fasteners to be driven into a work surface so that the operator does not have to reload the fastening tool after every shot, fastener magazines present their own set of problems. One of the greatest drawbacks is that fasteners frequently jam in the magazine and fastening tool mechanisms, as they exit the magazine into position along the drive axis of the fastening tool. Then it becomes necessary for the operator to stop work and clear the fastener jam. If, as is frequently the case, the jam is not readily accessible with the magazine attached to the fastening tool, the operator must at least partially remove the magazine from the fastening tool. Ideally, the magazine can be completely removed from the fastening tool to expose more of the drive track for clearing the jam, or to load more fasteners.

However, providing a fastening tool with a totally-removable magazine presents another set of problems. A typical job site demands that any system for retaining the magazine on the fastening tool be robust. This means, for example, that the magazine will not separate from or become misaligned with the fastening tool during the hard use typically experienced by a fastening tool in that environment. In addition to the typical shocks that a fastening tool encounters during the course of the day when being thrust against unyielding work surfaces, fastening tools are frequently dropped; and at the end of the day, they are often thrown into the back of a pickup truck. So the core issue is, how do you design a magazine retention system in which the magazine is easily removable, but that consistently survives the rigors of the job site? It is no wonder that many fastening tool manufacturers have opted to produce tools either with non-removable magazines, or tools where only part of the magazine is removable to clear jams or to load fasteners into the magazine.

To date, conventional attempts to solve the problem have been unsatisfactory. On the one hand, some manufacturers have opted to use simple hook-and-latch systems in an effort to keep costs down. However many of these types of systems fail to maintain the magazine in alignment with the fastening tool drive track, thereby creating a jam-plagued tool, and others simply do not survive long on the job site. On the other hand, in attempting to make magazine retention systems more robust, several manufacturers have made their systems unduly complicated and expensive, such as by requiring that the operator use tools and/or manipulate the latch mechanisms along two or more axes. For example, one conventional system requires that the fastening tool operator use two simultaneous but different motions, namely moving a lever in one direction while simultaneously pushing a button in another direction to release the magazine from the fastening tool. Another system uses an expensive assembly of multiple spring-biased components to latch and unlatch the magazine from the fastening tool. Furthermore, conventional fastening tools with magazines, particularly concrete nailers, do not provide full access to the fastening tool drive track to enable jams involving nails as long as 2½ inches to be easily cleared.

In essence, the state of the art has yielded just two types of solutions: cheap, but not robust; or much more expensive, complicated and more difficult to use. What is needed is a tool-free, low-cost system that requires only a single motion to attach a magazine to, or release it from, a fastening tool, but that provides consistently robust magazine retention even under the most challenging of job site conditions. What is also needed is a magazine that will cooperate with the fastening tool drive track if a nail, including a nail at least as long as 2½ inches, is ever jammed, to provide ready access to the drive track to clear the jam.

SUMMARY OF THE INVENTION

Accordingly, one embodiment of the fastening tool of the present invention provides an elegant solution to all of these problems. In essence, the fastening tool operator need only rotate a one-piece wedge or cam in a single motion against one of a fastening tool housing member and a magazine housing member, thereby sandwiching the wedge and housing members together to releasably retain the magazine on the fastening tool. If desired, that single motion also can simultaneously move one or more lobes of the cam into one or more chambers defined by one of the fastening tool and magazine housings, which thus provides a secondary retention system that is useful, for example, if the fastening tool is dropped. A biasing agent cooperates with the cam to create an over-center latch that releasably retains the cam in the latched position.

To remove the magazine, the fastening tool operator need only rotate a cam lever in the opposite direction to rotate the cam and disengage the over-center latch. This rotation simultaneously releases the wedge and moves the cam lobe(s) out of the chamber(s). The magazine can now be removed from the fastening tool. The magazine retention system of the present invention thus provides a single-motion, tool-free method for quickly and reliably disconnecting a magazine from, and reattaching a magazine to, the fastening tool. Furthermore, the magazine includes a drive interface that cooperates with a drive track of the fastening tool to guide the nails, including those at least as long as 2½ inches, along the drive axis. When the magazine is removed to clear a jam, a full 2½ inches of the concrete nailer drive track is exposed, thereby giving an operator sufficient access to clear the jam.

In addition to being simple, easy to use and robust, the magazine retention system of the present invention is inexpensive to implement. One major reason is because the fastening tool and magazine housings themselves not only provide two of the elements of the wedge sandwich, but also define the chambers for retaining the cam lobes. Inasmuch as the housing members are formed during the same molding operations as are the rest of the respective fastening tool and magazine housings, the housing members are provided at little or no additional cost. Another major reason is that only three additional parts need be provided to complete the magazine retention system of the present invention: a cam, a pressure member and a spring, which three parts cooperate to form the over-center latch system.

Another embodiment of a magazine retention system of the present invention also provides a simplified and even less expensive, yet robust, solution for releasably connecting a fastener magazine to a fastening tool. In this embodiment, one of the fastening tool and fastener magazine housing members includes a floating nut operatively associated with a bolt defining an axis. The other of the fastening tool and fastener magazine housing members defines a bolt receptacle operatively associated with the bolt and being axially aligned with the bolt axis. The fastener magazine is first attached to the fastening tool; the bolt is then threaded through the floating nut and is tightened against the bolt receptacle, thereby releasably retaining the magazine on the fastening tool. One of the advantages of this embodiment is that the bolt receptacle may be configured to define a conical surface axially aligned with the bolt and the floating nut, so that the bolt receptacle conical surface and the bolt cooperate to compensate for variations in tolerances as the bolt is tightened through the nut and against the receptacle.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION OF THE INVENTION

Figure 1:
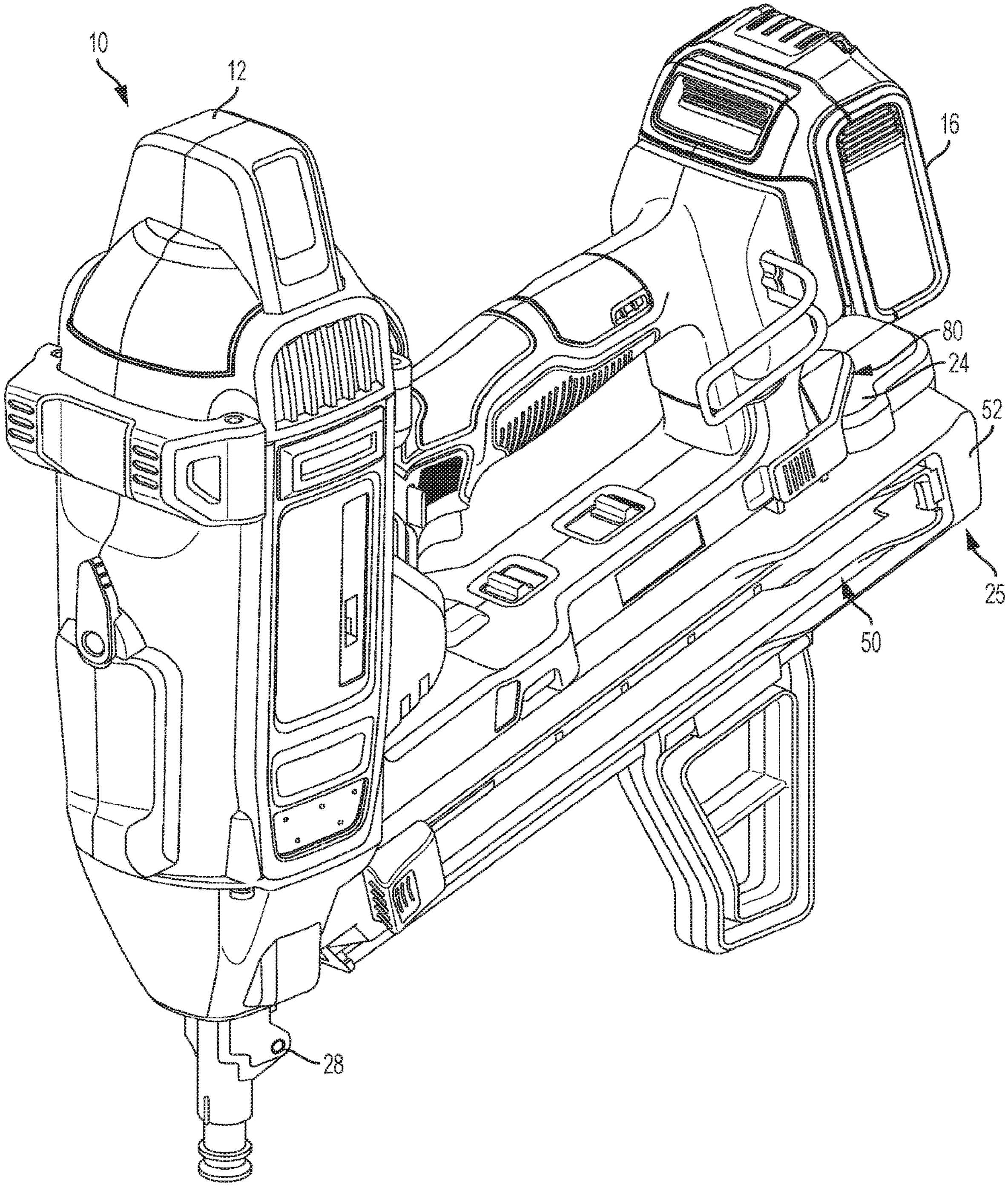
FIG. 1 is a perspective view of one embodiment of a fastening tool and magazine of the present invention.
Figure 2:
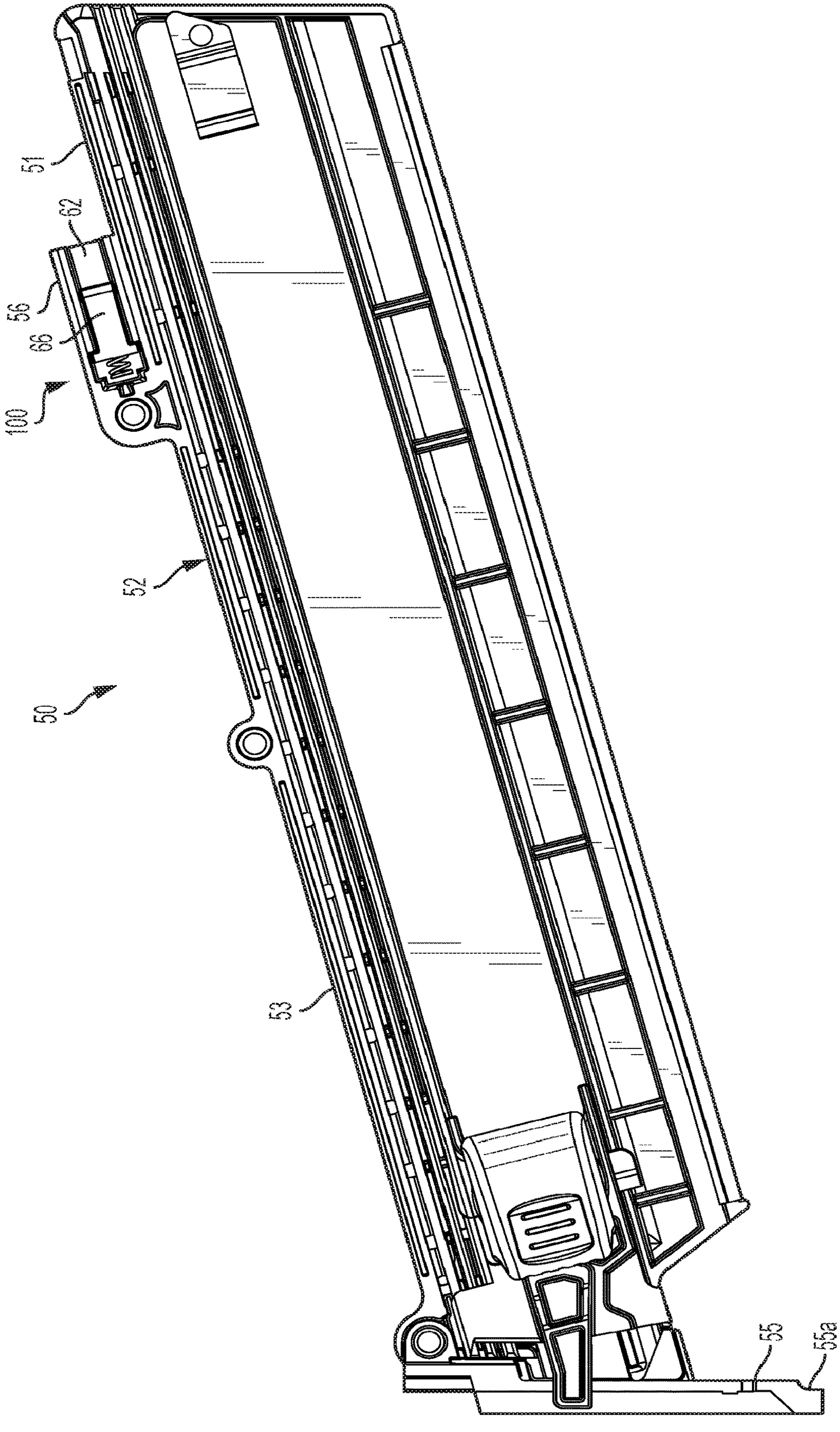
FIG. 2 is an enlarged elevational detail view of half of the magazine of FIG. 1, the other half being omitted for clarity.
Figure 4A:
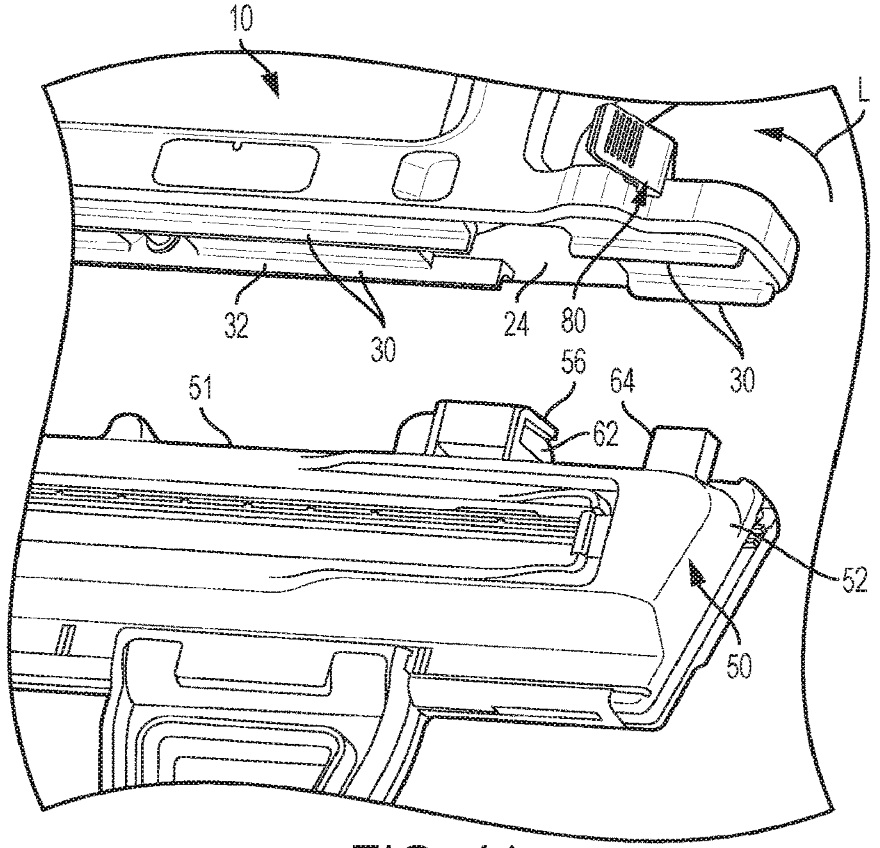
FIGS. 4A and 4B are enlarged partial elevational detail views of the magazine and fastening tool of FIG. 1 spaced apart and illustrating the position of a cam in the unlatched and latched positions, respectively.
Figure 4B:
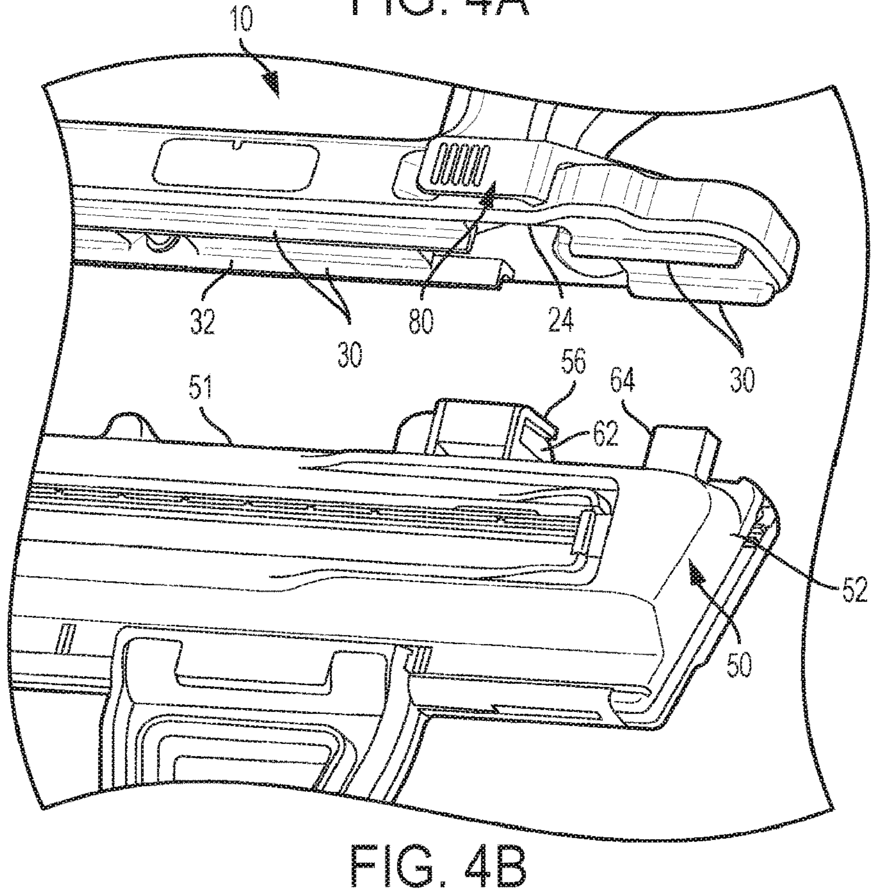
Figure 5A:
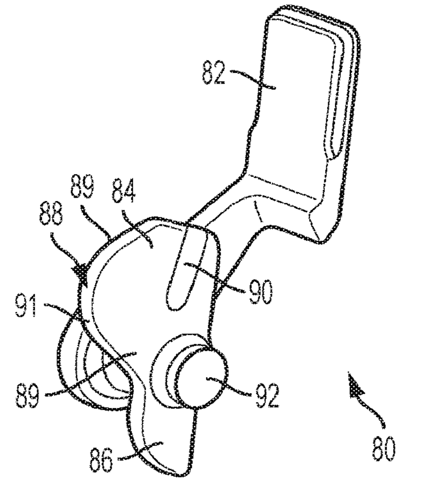
FIG. 5A is a perspective detail view, taken from the rear, of a cam used in the magazine retention system of the fastening tool of FIG. 1.
Figure 5B:
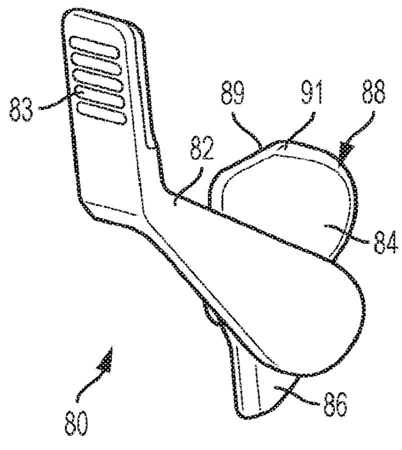
FIG. 5B is a perspective detail view, taken from the front, of the cam of FIG. 5A.
Figure 5C:
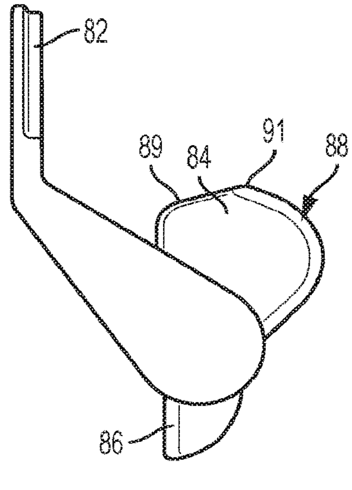
FIG. 5C is a left side elevational view of the cam of FIG. 5A.
Figure 5D:
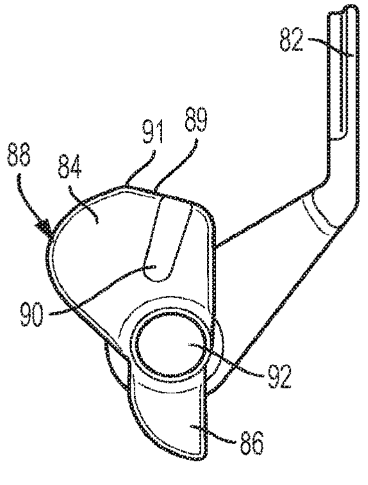
FIG. 5D is a right side elevational view of the cam of FIG. 5A.
Figure 5E:
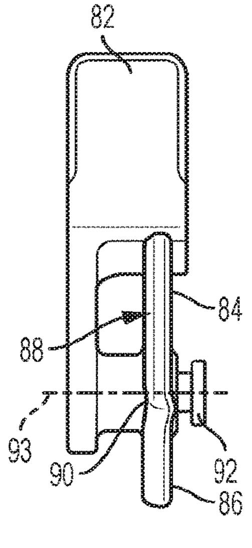
FIG. 5E is a front elevational view of the cam of FIG. 5A.
Figure 5F:
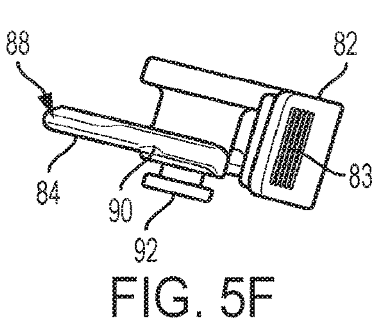
FIG. 5F is a top plan view of the cam of FIG. 5A.
Figure 9A:
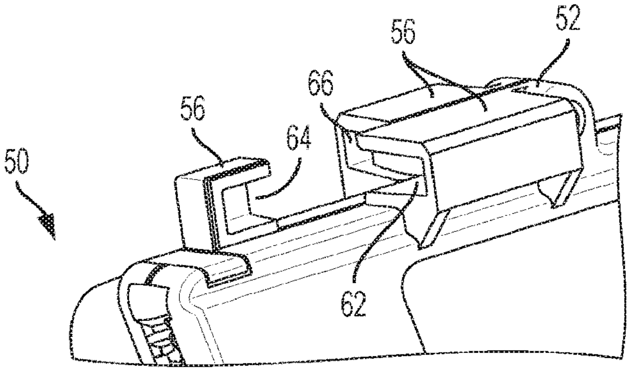
FIG. 9A is a partial perspective detail view of the chambers defined by housing members of the magazine of FIG. 1.
Figure 9B:
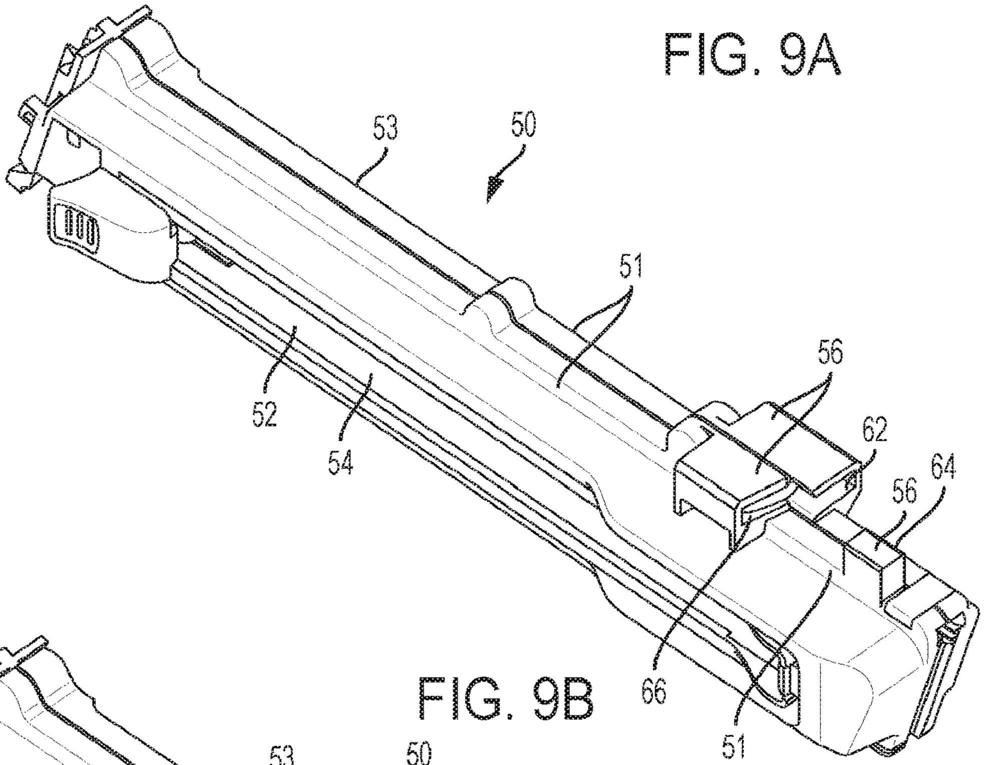
FIG. 9B is a perspective detail view, taken from above, of the magazine of FIG. 1.
Figure 9C:
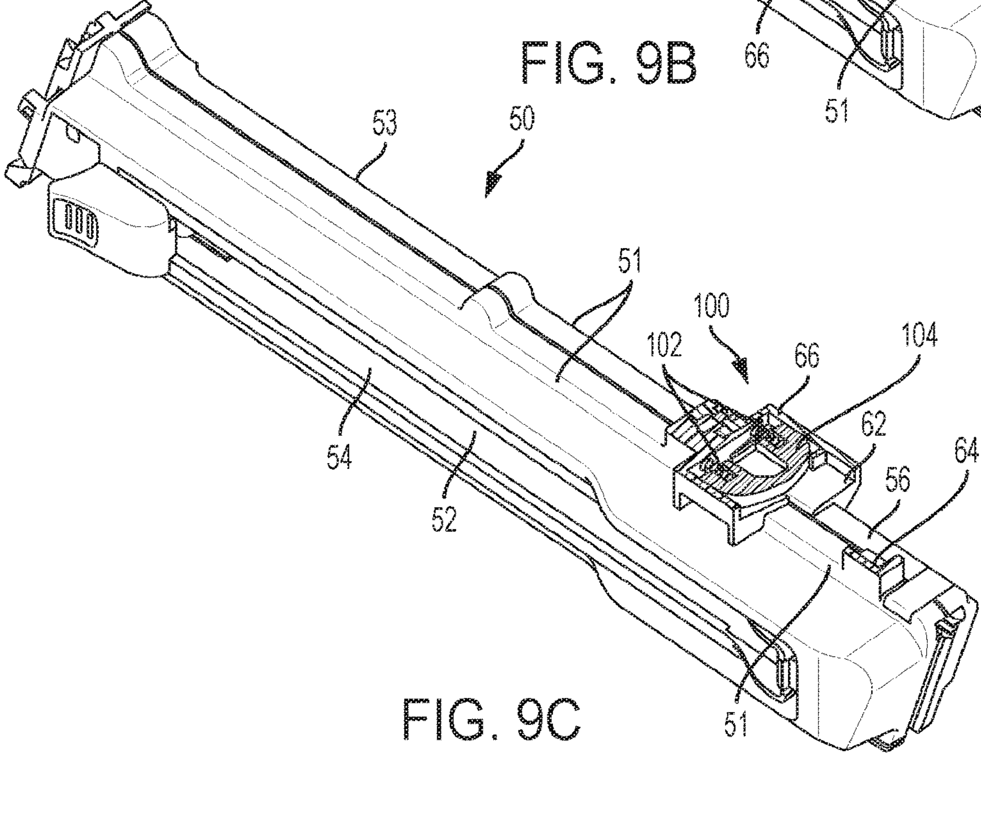
FIG. 9C is a perspective detail view of the magazine of FIG. 9B, with a portion cut away.
Figure 10:
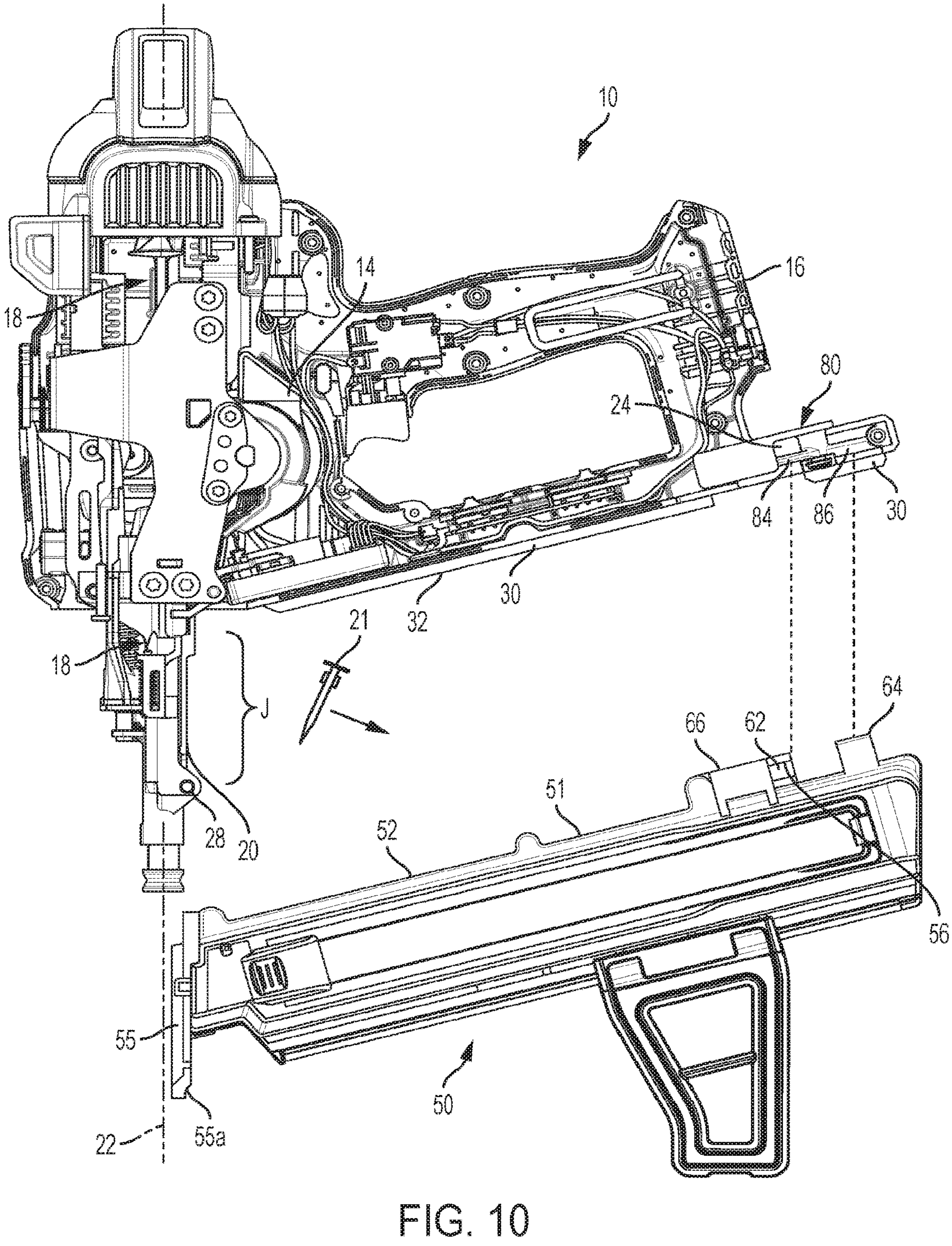
FIG. 10 is an exploded elevational view of the fastening tool (with one housing half removed) and magazine of FIG. 1.

Referring now to the drawings and particularly to FIGS. 1, 9C and 10, a fastening tool 10 in accordance with an embodiment of the present invention includes a housing 12, a motor 14 disposed in the housing, a battery pack 16 for providing power to the motor, and a drive system 18 including a drive track 20. The motor 14 and drive system 18 are configured for driving a fastener, such as a 2½ inch nail 21, along a drive axis 22. The housing 12 includes a plurality of fastening tool housing members 24 that, as described below, play significant roles in the operation of a magazine retention system 25 of the present invention. The main elements of the magazine retention system 25 accordingly include the fastening tool housing 12 and the fastening tool housing members 24, plus a magazine 50, a plurality of magazine housing members 56, a cam 80 and a biasing agent 100 (FIG. 9C). Referring again to FIGS. 1 and 10, the fastening tool 10 further includes a pivot member 28 disposed proximate the lower end of the drive track 20. Now referring also to FIGS. 4A and 4B, the fastening tool 10 additionally defines alignment surfaces 30 disposed on a bottom portion 32 of the housing 12, that cooperate with corresponding surfaces on the magazine 50, as described below.

At this point, it should be noted that although the embodiments of the present invention depicted in the Drawings are shown as concrete nailers, it will be appreciated that the present invention can be incorporated in any fastening tool, including, without limitation, staplers and other nailers. Furthermore, although the embodiments of the magazine retention system 25 are shown being used in connection with a fastening tool using an electric-powered drive system, it will be appreciated that the magazine retention system of the present invention is also capable of being used in connection with fastening tools using pneumatic, hydraulic, and gas/explosive drive systems, among others.

Moving now to the magazine 50, one embodiment is shown, for example, in FIGS. 1, 2, 4A and 4B, 9B and 9C, and 10. The magazine 50 includes a magazine housing 52, that further includes right and left halves 53 and 54, respectively (FIGS. 2, 9B and 9C), and magazine alignment surfaces 51, that cooperate with respective fastening tool alignment surfaces 30 to maintain the magazine in alignment with the fastening tool 10 as the magazine is being attached to the fastening tool, and thereafter. As shown particularly in FIG. 10, the magazine 50 also includes a drive interface 55 that in turn defines a pivot member-engaging portion 55*a*. The magazine 50 supplies a plurality of fasteners such as nails 21 to the fastening tool drive track 20 via the magazine drive interface 55. Magazine housing 52 also includes the plurality of magazine housing members 56, that cooperate with respective fastening tool housing members 24 in the magazine retention It will be useful now to describe how the fastening tool 10 and the magazine 50 cooperate to provide ready access to a nail ranging in length up to at least 2½ inches. Referring to FIG. 10, when connected together, the magazine interface 55 cooperates with the fastening tool drive track 20 to maintain a fastener, such as the 2½ inch nail 21, aligned with the drive axis 22. By incorporating part of the nail-guiding system into the magazine drive interface 55, and by making the drive track-magazine interface combination at least as long as 2½ inches, at least 2½ inches of the drive track 20 will be exposed when magazine 50 is removed from fastening tool 10. Consequently, the cooperation of these elements provides plenty of room to clear the jams from the region J when the magazine 50 is detached from the fastening tool housing 12, yet it accurately aligns fasteners 21 along the drive axis 22 when the magazine and fastening tool housing are connected together.

Figure 3A:
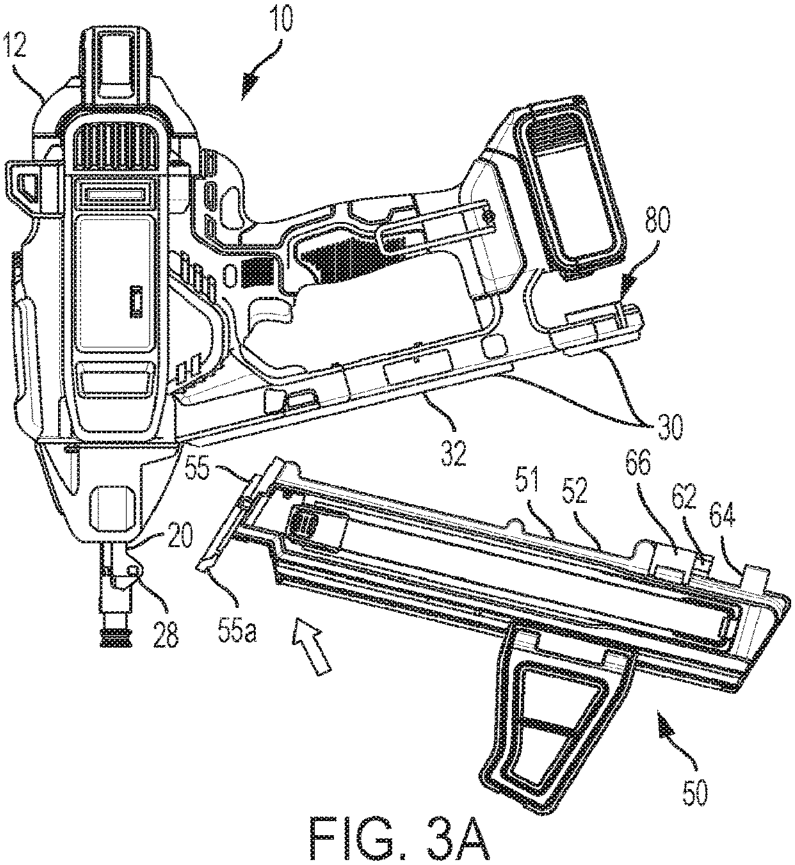
FIGS. 3A and 3B are elevational detail views of the magazine and fastening tool of FIG. 1 as they are being connected together.
Figure 3B:
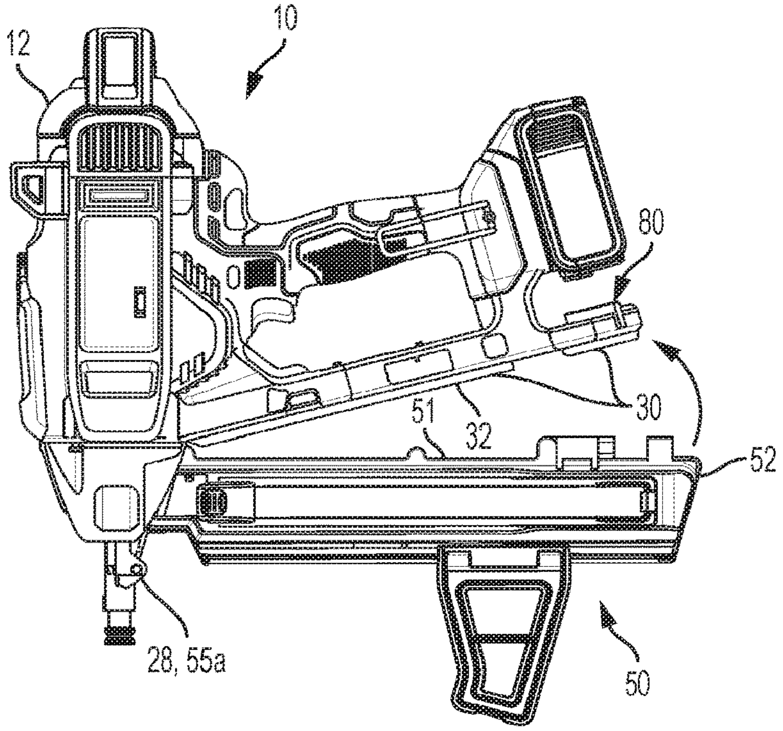
Figure 7:
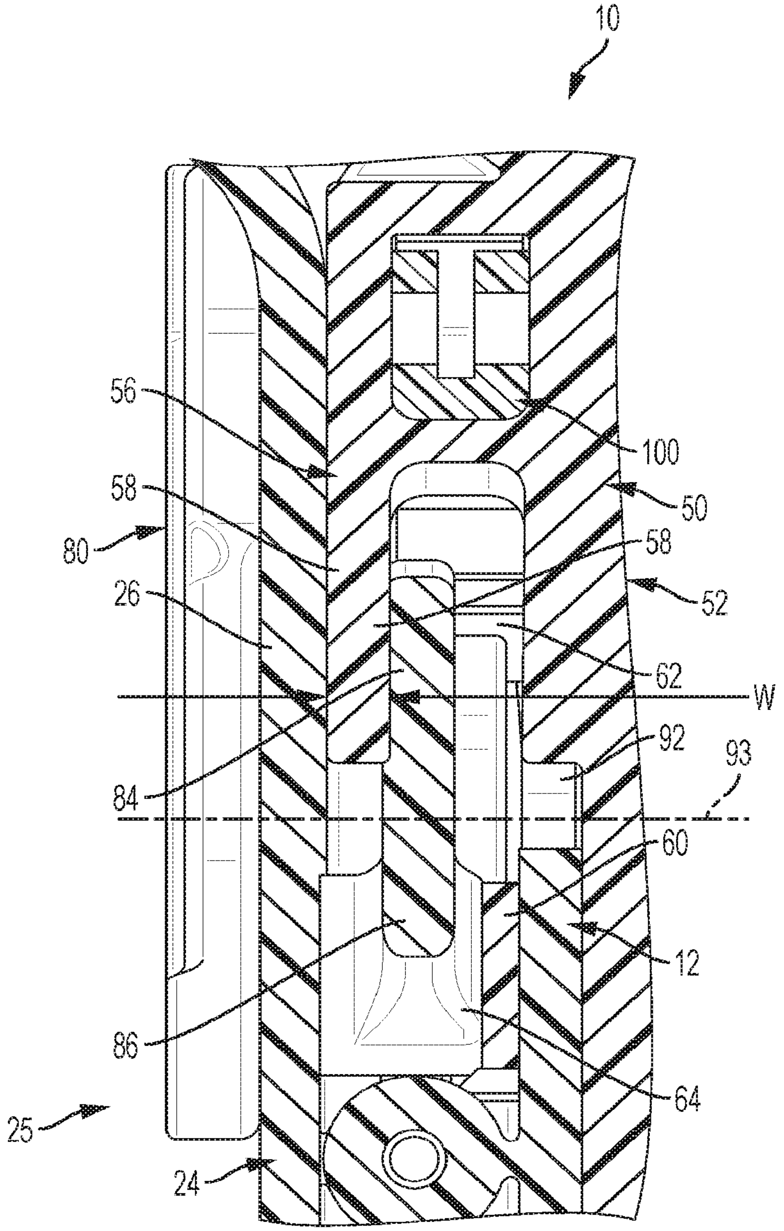
FIG. 7 is a partial sectional detail view of the fastening tool of FIG. 1, taken along line 7-7 of FIG. 6A.

Looking now at FIGS. 3A and 3B, to attach the magazine 50 to the fastening tool 10, the magazine is first positioned proximate the bottom portion 32 of the fastening tool so that alignment surfaces (not shown) on respective portions of the drive track 20 and the drive interface 55 are aligned, and so that the pivot member-engaging portion 55*a* is positioned proximate the pivot member 28. Then, as shown by the arrow in FIG. 3B, the magazine 50 is pivoted about the pivot member 28 toward the fastening tool bottom portion 32 so that respective magazine alignment surfaces 51 cooperate with fastening tool alignment surfaces 30 to maintain the magazine in alignment with the fastening tool 10, and so that certain of the fastening tool and magazine housing members 24, 56 are disposed adjacent to one another (FIG. 7). After the magazine 50 is fully engaged with the fastening tool 10, the respective alignment surfaces 30, 51 continue to maintain the alignment, as shown in the lower right-hand portions of FIGS. 11A and 11B. Then, as will be described below, an operator can releasably retain the magazine 50 in its properly-oriented position on the fastening tool 10 simply by rotating the cam 80 in a single plane against a force exerted by the biasing agent 100.

As shown in FIGS. 5A-5F, the cam or wedge 80 is a one-piece plastic unit having a lever 82 defining a ribbed portion 83, and further including a first lobe 84 and a second lobe 86. (If desired, the cam 80 may include just one lobe.) The first lobe 84 defines a cam profile 88 that includes an over-center stable region 89 adjacent a tipping point 91. The first lobe 84 also defines a female detent 90, that cooperates with a male detent 68 formed on the magazine 50 to releasably retain the cam 80 in an open or unlatched position (see FIGS. 11A and 11B). A cam pivot member 92 is rotatably disposed in the fastening tool housing 12 (see FIG. 7, and FIGS. 8A and 8B) about an axis 93, so that the cam lobes 84, 86 rotate in a single plane. The cam 80 cooperates with the biasing agent 100 to generate an over-center latch.

The biasing agent 100 is shown for example in FIGS. 9C, 11A, 11B, and 12A-12D, and includes two coil springs 102 disposed in respective spring chambers 103 defined by a pressure member 104. If desired, a single coil spring 102 of sufficient strength may be used instead. The pressure member 104 itself defines a pressure member cam profile 108 including an apex 110. As shown in FIGS. 9A-9C, the biasing agent 100 is disposed in a biasing agent chamber 66 defined by magazine housing members 56, such that the springs 102 normally bias the pressure member 104 in a direction outwardly of the biasing agent chamber. The operation of the magazine retention system 25 can now be described.

Figure 6A:
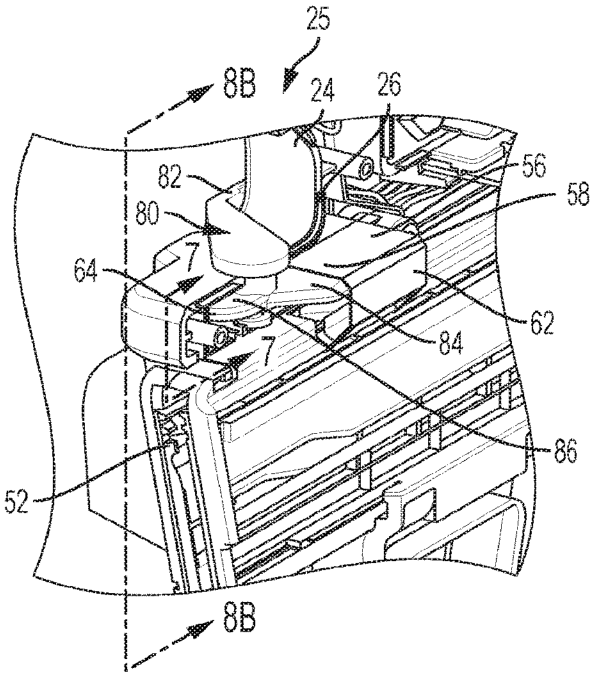
FIGS. 6A, 6B and 6C are partially cut-away perspective detail views of the magazine retention system of the fastening tool of FIG. 1, taken from the upper right rear of the fastening tool, and illustrating the relationship of the respective components as the cam is rotated from the closed to the open positions.
Figure 6B:
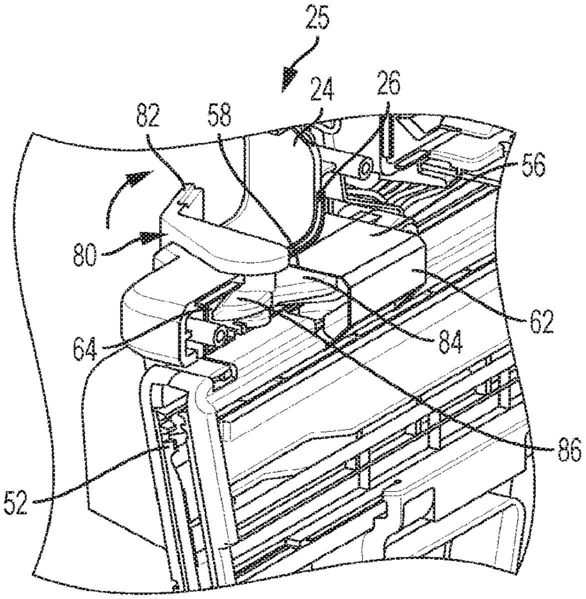
Figure 6C:
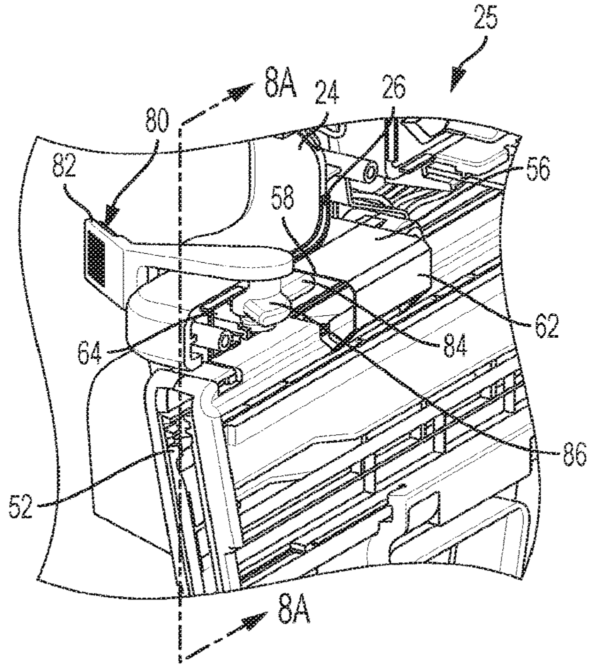
Figure 8B:
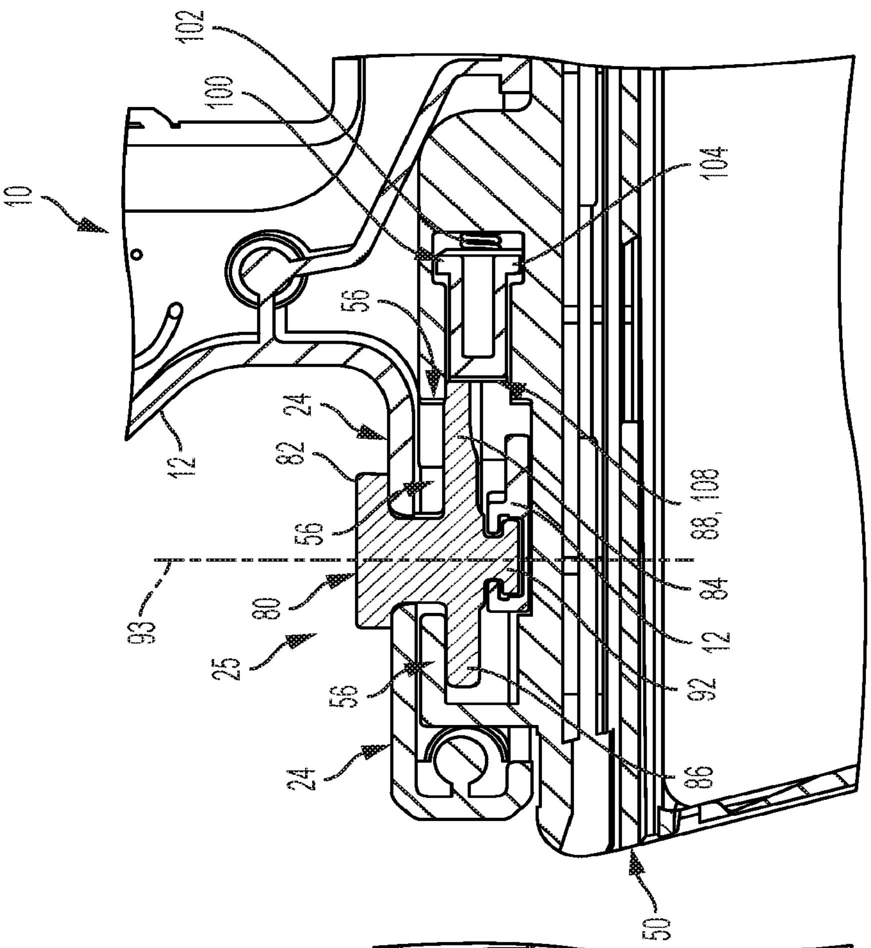
FIG. 8B is a partial elevational sectional view taken along line 8B-8B of FIG. 6A.
Figure 8A:
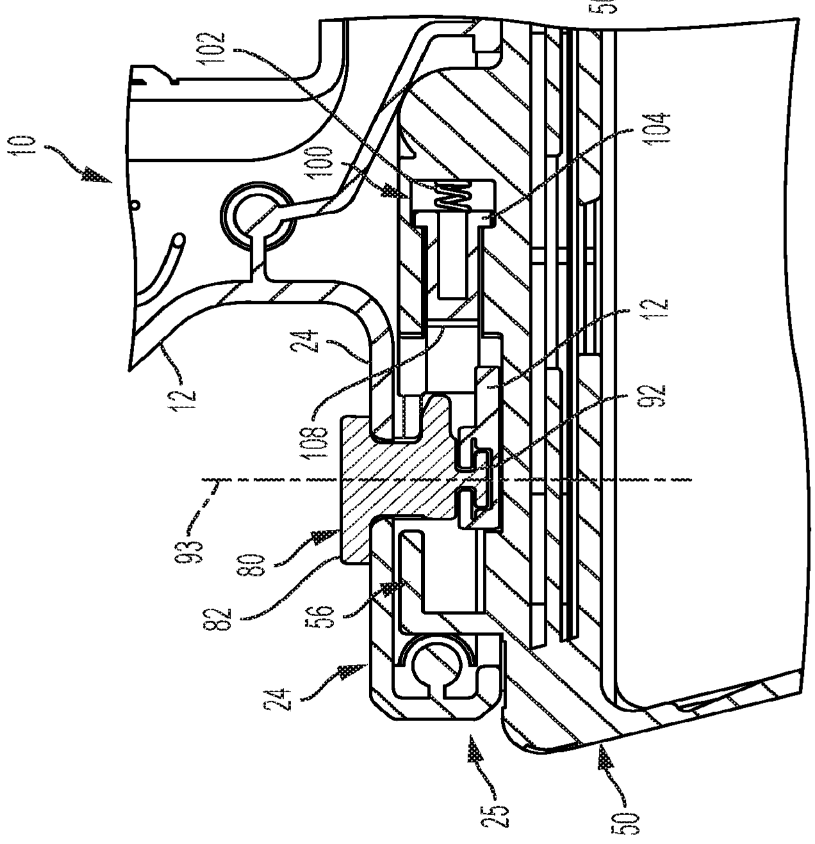
FIG. 8A is a partial elevational sectional view taken along line 8A-8A of FIG. 6C.
Figure 11A:
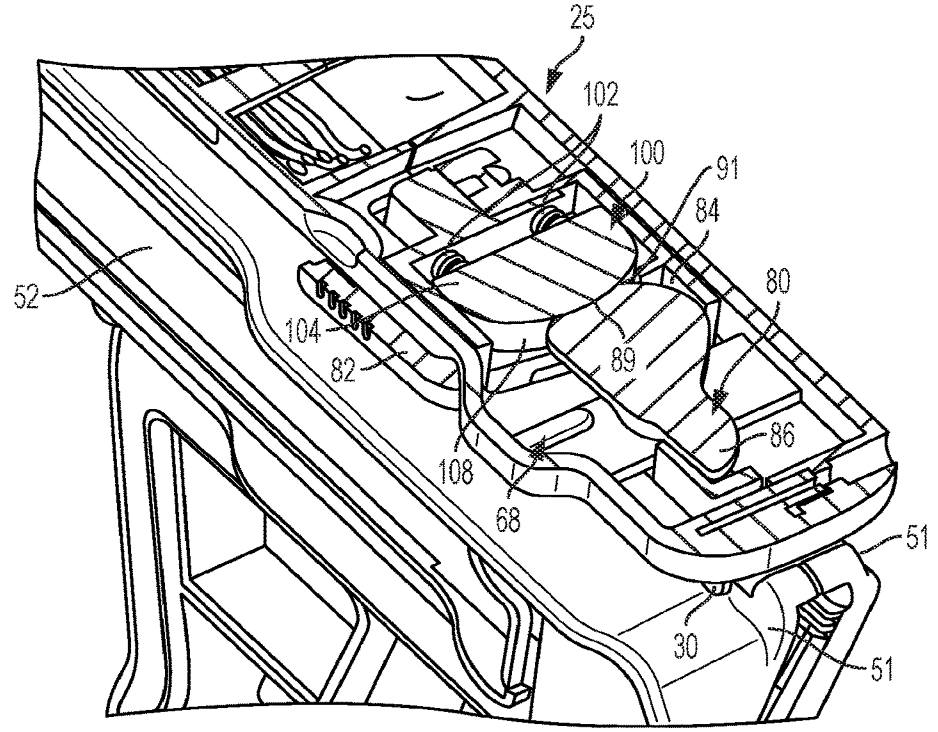
FIGS. 11A and 11B are partial perspective sectional views, with parts omitted for clarity, of the fastening tool and magazine of FIG. 1, showing the relative positions of the elements of the magazine retention system of the present invention in the latched and unlatched positions, respectively, and illustrating a detent used for maintaining the elements in the unlatched position.
Figure 11B:
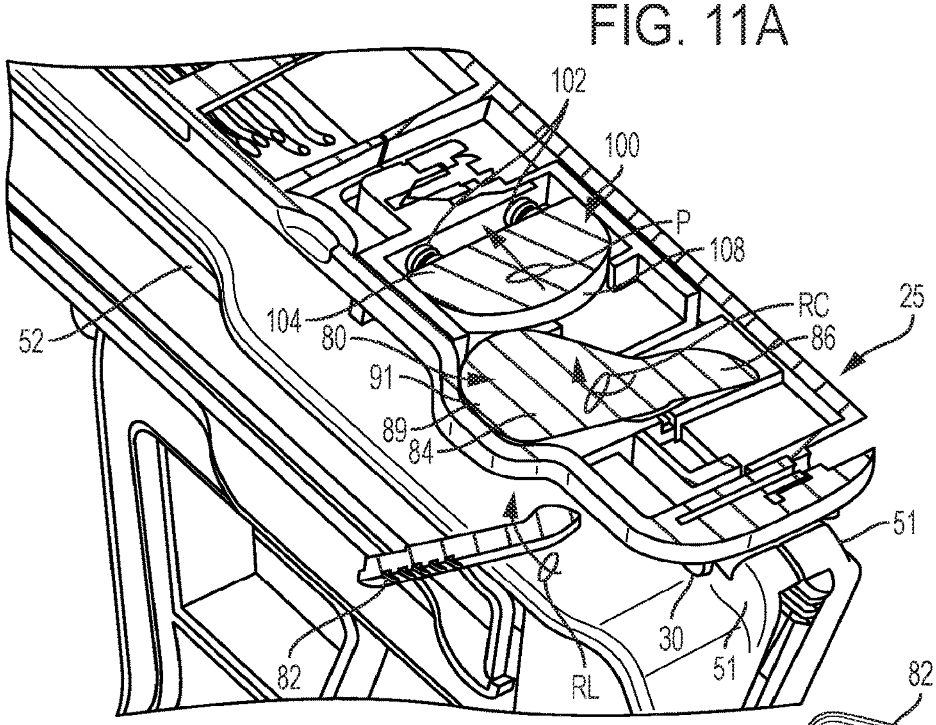
Figure 11C:
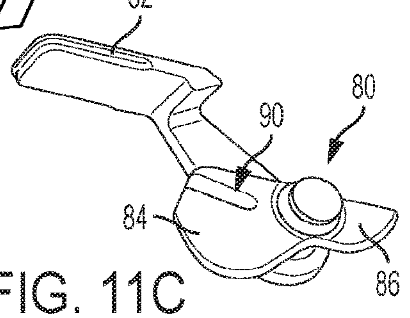
FIG. 11C is a perspective detail view of the cam of the present invention, showing in particular a detent that cooperates with the detent shown in FIG. 11A to maintain the elements in the unlatched position.
Figure 12A:
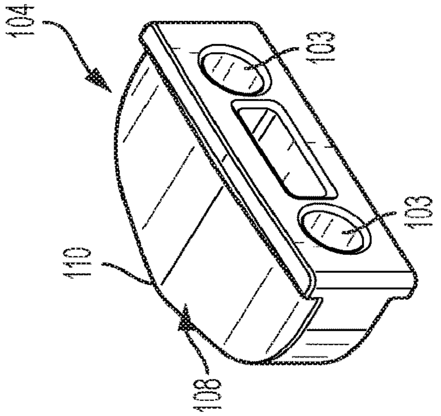
FIG. 12A is a perspective detail view of the pressure member of the magazine retention system of the fastening tool and magazine shown in FIG. 1.
Figure 12B:
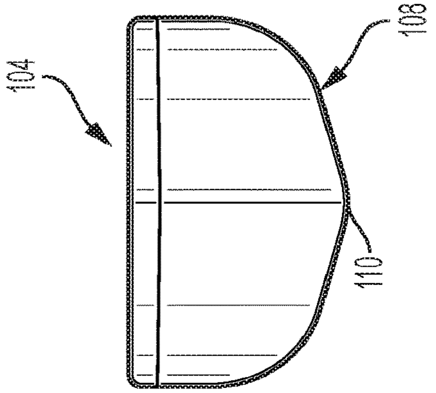
FIG. 12B is a top plan view of the pressure member of FIG. 12A.
Figure 12C:
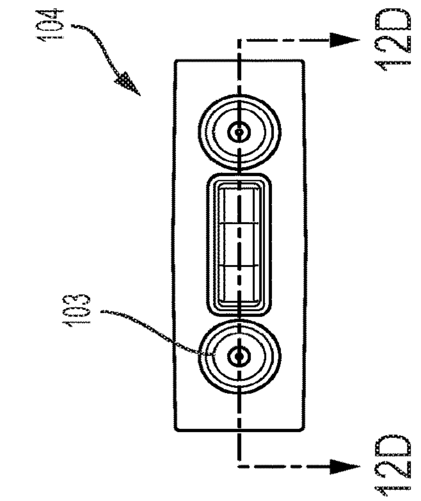
FIG. 12C is a front elevational view of the pressure member shown in FIG. 12A.
Figure 12D:
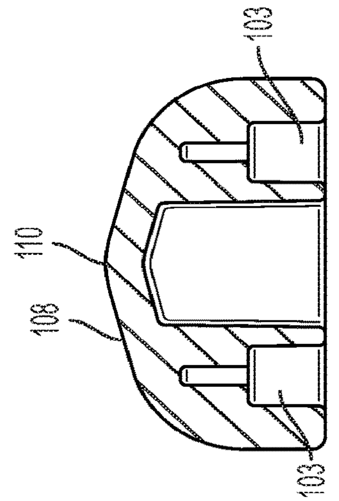
FIG. 12D is a sectional view taken along line 12D-12D of FIG. 12C.

A first element of a method according to the present invention of removably retaining the magazine 52 on the fastening tool 10 includes using the cam 80 to wedge a magazine housing member 56 against a fastening tool housing member 24, as shown by arrows W in FIG. 7, and as further illustrated in FIGS. 6A-6C, 8A, 8B, 11A and 11B. In the open or unlatched position, as shown in FIGS. 6C, 8A and 11B, the cam 80 has not yet engaged either a fastening tool housing member 24 or the pressure member 104 of the biasing agent 100. Then, as shown by the arrow in FIG. 6B, an operator begins to use the lever 82 to rotate the cam 80 clockwise (as viewed from the top), that thereby begins to rotate both the large and small lobes 84 and 86, respectively, out of their unlatched or open positions shown in FIG. 6C. As the cam 80 continues to rotate, the first lobe 84 of the cam will begin to engage the pressure member 104 so that respective cam profiles 88, 108 cooperate to start compressing coil springs 102, as shown by arrows RC and P in FIG. 11B. During this time, as shown in FIGS. 6B and 7, the first lobe 84 slides along a first wall 58 defined by a magazine housing member 56 and begins to wedge the first wall against a wall 26 defined by a fastening tool housing member 24. (Note that it is not the cam profile 88 that produces the wedging action.) The flat horizontal surface of the first cam lobe 84 slides across and wedges the magazine housing member first wall 58 against the fastening tool housing member wall 26. As such, the flat horizontal surface of first cam lobe 84 produces the wedging action. The wedging action is produced because, when the magazine 50 is attached to the fastening tool 10, cam 80 (and therefore lobes 84, 86) and walls 26, 58, are all oriented to be parallel to one another.

When the operator has moved the cam lever 82 to its closed or latched position shown in FIGS. 6A, 7 and 8B, the cam 80 now completely sandwiches the magazine first wall 58 between the first cam lobe 84 and the fastening tool wall 26. The magazine housing member 56 has now been wedged tightly against fastening tool housing member 24.

Figure 13:
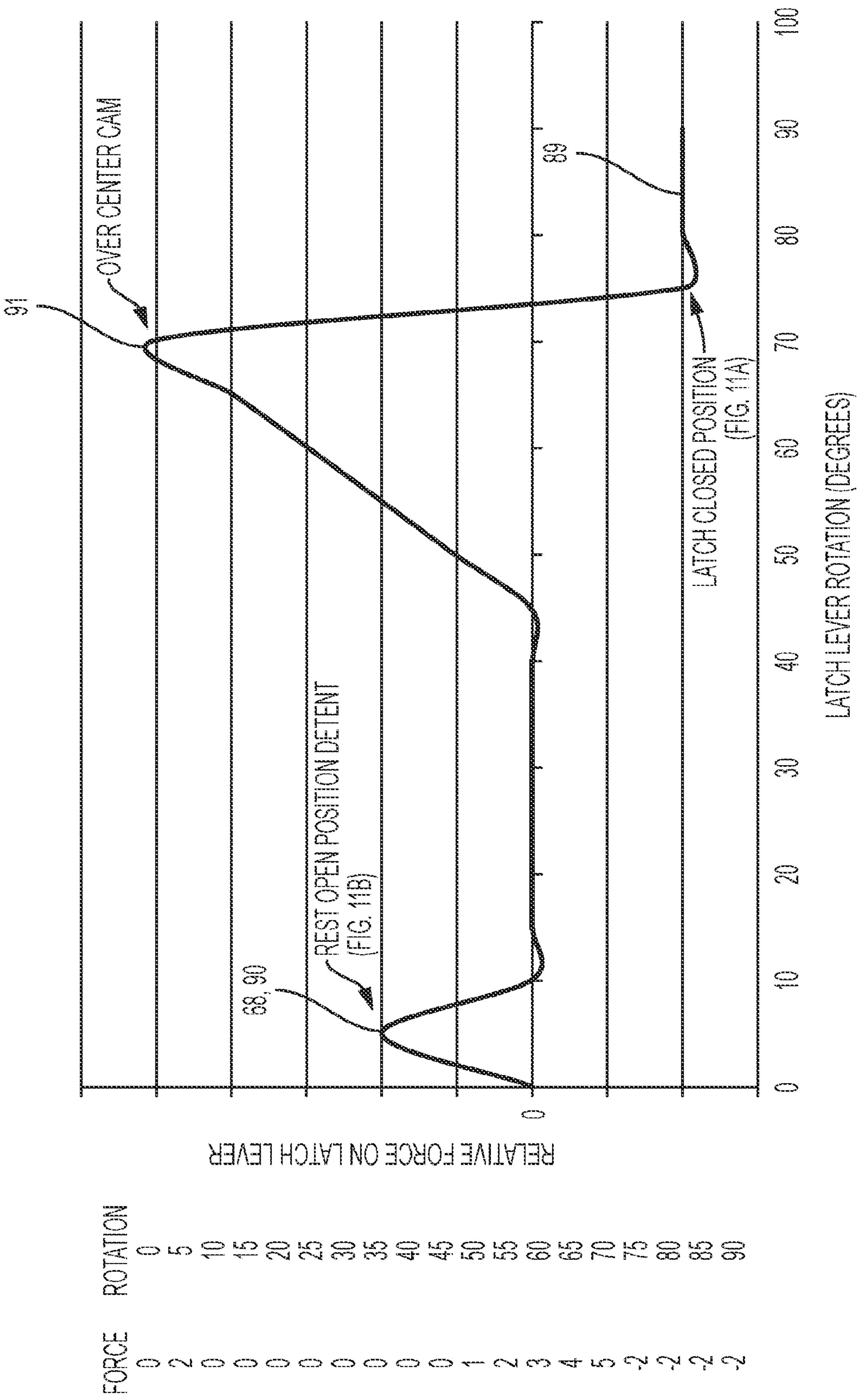
FIG. 13 is a force-rotation graph of the over-center latch of the present invention illustrating the relative force on the latch lever required to be overcome to rotate the latch lever from a rest (open) position through an over-center (closed) position.

The wedged elements 24, 56 and 80 are releasably retained in their latched or closed position by the operation of an over-center latch created by the cooperation of the cam 80 with the biasing agent 100. Referring once again to the cam profiles 88, 108 shown, respectively, in FIGS. 5A and 12B, the progress of the cam 80 in latching the magazine 50 to the fastening tool 10 is illustrated in the force-rotation chart of FIG. 13. Beginning at the open position shown in FIG. 11B, where the cam detent 90 cooperates with the magazine detent 68 to releasably retain the cam in the unlatched or open position, the chart shows that just a slight amount of force is required to move out of the detented position. This is followed by a short distance where no appreciable force need be exerted on the cam, by virtue of its configuration, until it has rotated a distance of approximately 45°. Then, as the cam profile 88 that is presented to the pressure member 104 changes, the force rapidly increases until the cam profile reaches its tipping point 91. If the operator continues to exert force on the cam lever 82, and as the cam 80 continues to encounter its wedging resistance against the first wall 58 of magazine housing member 56, the cam 80 will rapidly snap over the tipping point (the over-center action), that is illustrated by the steep decline of the curve of FIG. 13 from about 5 pounds of force to about −2 pounds of force. The cam 80 then reaches its steady-state closed or latched position where an over-center stable region 89 of the cam profile 88 is retained against a complementary region of the pressure member profile 108, as shown in FIG. 11A.

Figure 14A:
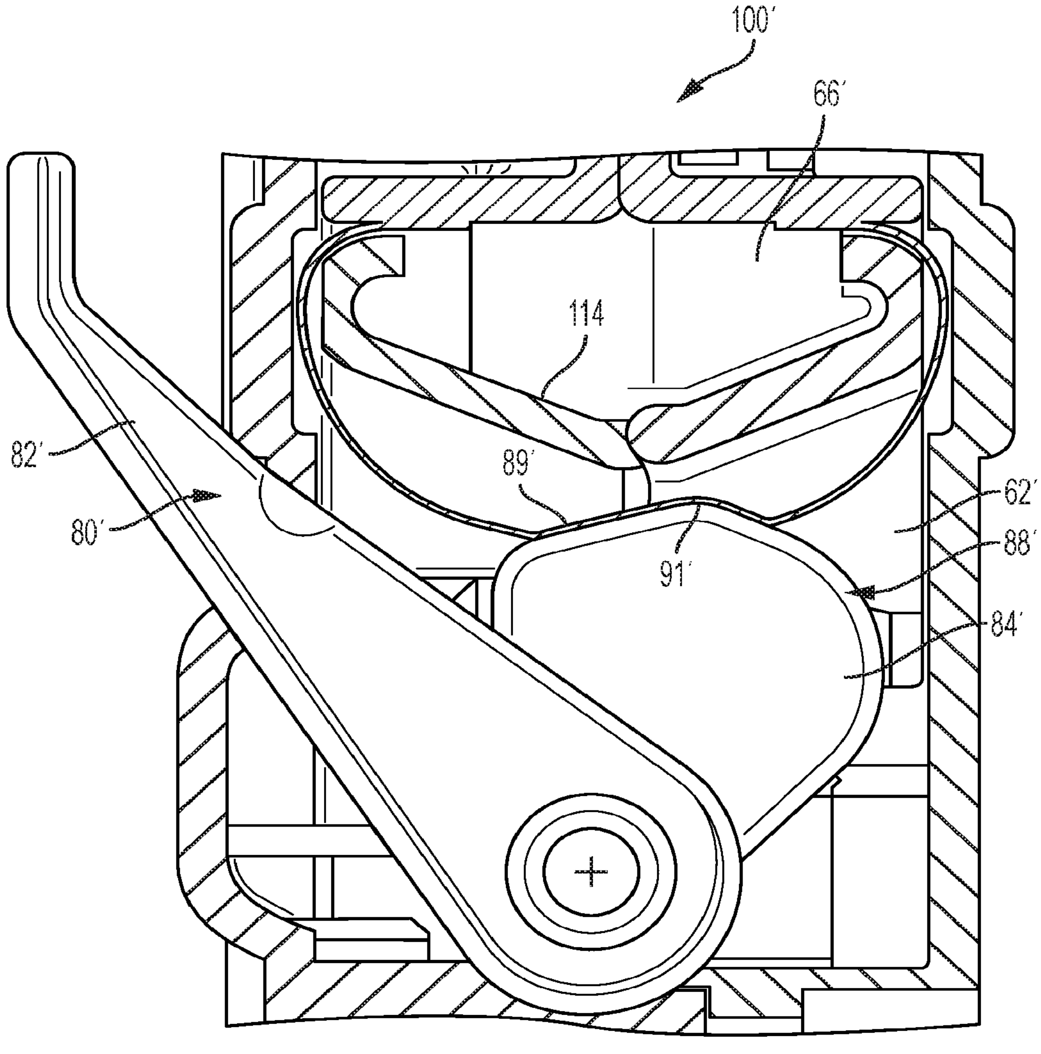
FIG. 14A is an enlarged detail view, partially in section, of another embodiment of a biasing agent of a magazine retention system of the fastening tool and magazine of FIG. 1.
Figure 14B:
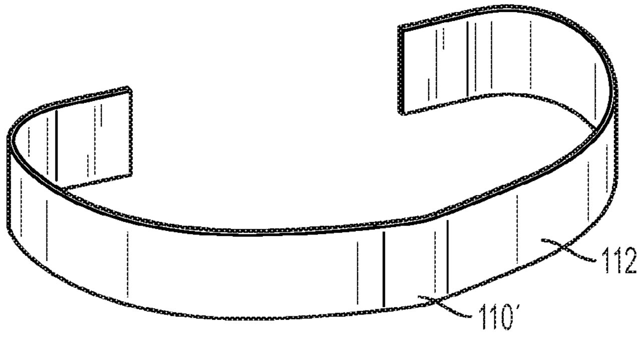
FIG. 14B is an enlarged perspective detail view of a sheet spring of the biasing agent of FIG. 14A.

In one embodiment of the magazine retention system 25, the springs 102 should be selected to exert a total of from 1 to 5 pounds of force (½ pound to 2½ pounds each) and preferably 3 pounds (1½ pounds each). Another embodiment of a cam 80' cooperating with a biasing agent 100' is shown in FIGS. 14A and 14B. Here the coil springs 102 have been replaced by a single sheet spring 112 defining an apex 110' and supported by a spring support 114. As shown in FIG. 14A, the sheet spring 112 deforms to conform to a cam stable region 89' and tipping point 91'. However, the sheet spring 112 should also be selected to exert a force ranging from 1 to 5 pounds, and preferably 3 pounds. All of the other elements of the fastening tool 10 and magazine 50 remain the same, such that, for example, a cam first lobe 84' defines a cam profile 88'.

Figure 15:
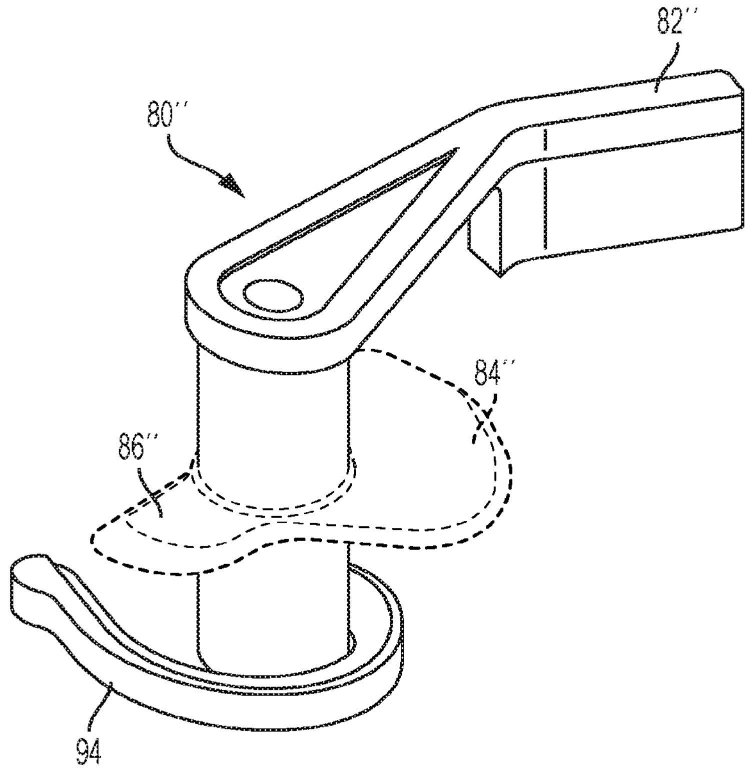
FIG. 15 is an enlarged perspective detail view of another embodiment of the cam of the present invention.

As shown in FIG. 15, still another embodiment of the present invention includes a one-piece cam 80" that again is made of plastic and that defines a lever 82" and first and second cam lobes 84", 86" (shown in phantom for clarity). However, this embodiment of the one-piece cam 80" also includes a built-in flexible biasing agent 94 that should be selected to exert the same ranges of forces as previously noted with respect to the other embodiments of the biasing agents 100, 100' described above.

In the first embodiment of the fastening tool 10 and magazine 50 of the present invention shown in FIGS. 1-15, the cam 80 is shown rotatably mounted on the fastening tool housing 12; and the biasing agent 100, together with the various chambers to be discussed shortly, are disposed on the magazine. However, if desired, the locations of these elements may be reversed, as shown schematically in FIGS. 16A and 16B that illustrate another embodiment of a fastening tool 200 and a magazine 250 of the present invention. Here a cam 280 is disposed on a magazine housing 252 instead of the fastening tool housing 12, and a biasing agent 290 and various chambers are disposed on the fastening tool 200; this embodiment will be discussed at greater length shortly.

As shown in FIG. 7, a first element in a method according to an embodiment of the present invention of removably retaining the fastener magazine 50 on the fastening tool 10 includes the act of wedging together respective proximately-disposed magazine and fastening tool housing members 56, 24, described above. If desired, a second element in this method may include, simultaneously with rotating the cam 80 against the magazine housing member 56, rotating cam lobes 84, 86 into respective chambers created by magazine housing members 56. This creates a secondary retention system that is effective to assist in retaining the magazine 50 on the fastening tool 10, for example, if the fastening tool is dropped.

Referring now to FIGS. 2, 6A-6C, 7, 8A and 8B, 9A-9C, 10 and 11A-11C, the magazine 50 of an embodiment of the present invention may, if desired, include first and second chambers 62, 64, and a biasing agent chamber 66. Also if desired, a single chamber can be provided to accommodate cams 80 having just a single lobe. Furthermore, the first chamber 62 and the biasing agent chamber 66 may be defined by respective magazine housing members 56, and the second chamber 64 may also be defined at least in part by a magazine housing second wall 60 (FIG. 7). This second element of the method according to the present invention of removably retaining the magazine 50 on the fastening tool 10 is illustrated, for example, in FIGS. 6A-6C.

As an operator begins to rotate the cam lever 82 clockwise from the open or unlatched position shown in FIG. 6C, the first and second cam lobes 84, 86 also necessarily begin simultaneously to rotate (FIG. 6B). Finally, when the operator has completely rotated the cam lever 82 to its closed or latched position shown in FIG. 6A, the first and second cam lobes 84, 86 have entered corresponding first and second chambers 62, 64, respectively. Various elements of the chambers 62, 64 now cooperate with the first and second cam lobes 84, 86 to assist in retaining the magazine 50 on the fastening tool 10, for example, in the event the fastening tool is dropped. For purposes of illustration, the magazine 50 is shown in FIG. 10 juxtaposed with the fastening tool 10, so that cam lobes 84, 86 are positioned over their respective chambers 62 and 64, as shown by the dotted lines.

Figure 16A:
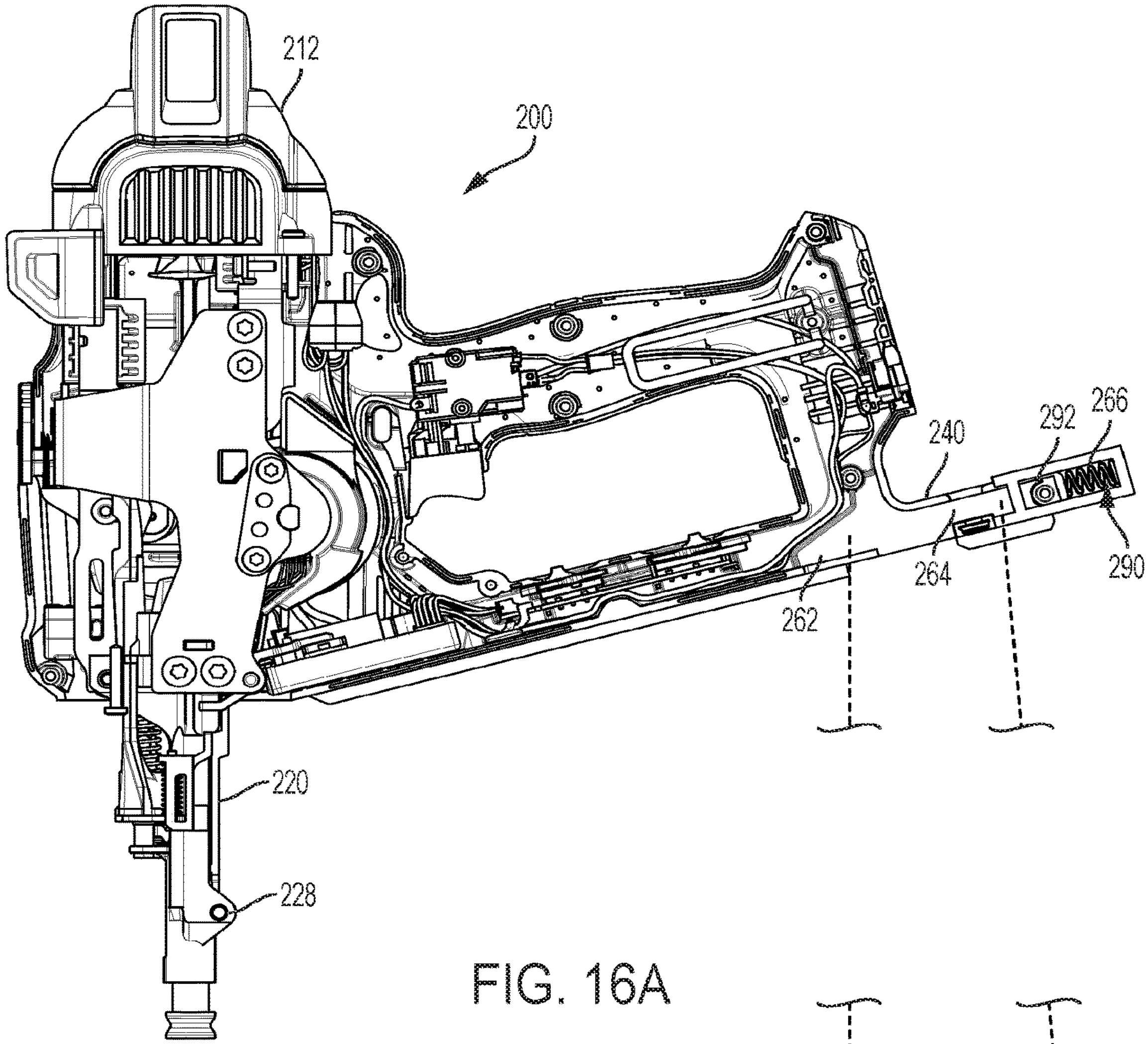
FIG. 16A is a schematic elevational detail view, with one housing half removed for clarity, of another embodiment of the fastening tool of the present invention.
Figure 16B:
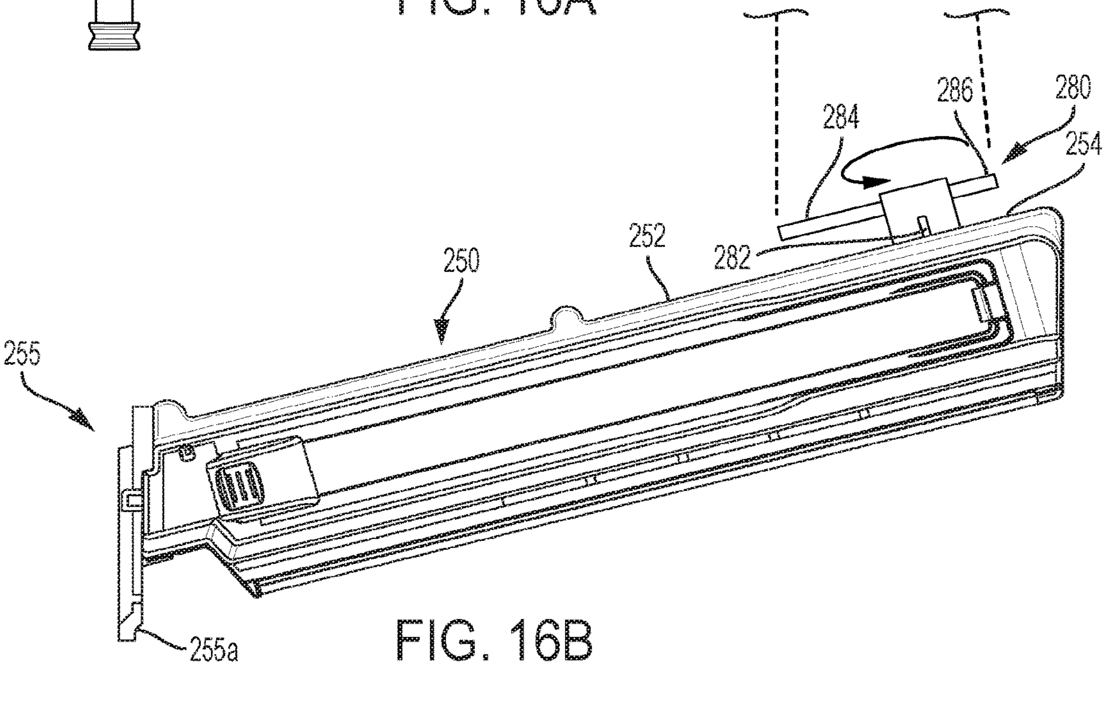
FIG. 16B is a schematic elevational detail view of a magazine for use with the fastening tool of FIG. 16A.

Returning to the embodiment of the fastening tool 200 and magazine 250 shown in FIGS. 16A and 16B, the fastening tool includes a housing 212, a drive track 220, and a pivot member 228. The fastening tool housing 212 also includes a plurality of fastening tool housing members 240 that in turn define first and second chambers 262, 264, as well as a biasing agent chamber 266. In this embodiment of the magazine 250, a drive interface 255 defines a pivot member-engaging portion 255*a*, that cooperates with pivot member 228, as was described in reference to the first embodiment of the fastening tool 10 and magazine 50. The magazine 250 also includes a magazine housing 252 that defines a plurality of magazine housing members 254. A wedge or cam 280 is rotatably mounted on the magazine housing 252 and is operated by a lever 282. The cam 280 includes first and second lobes 284, 286 which, after the magazine 250 has been connected to the fastening tool 200, may be rotated into respective chambers 262, 264, as shown by the dotted lines, as the cam 280 is rotated against the force of a biasing agent 290 acting on a pressure member 292. During this rotation, the cam 280 wedges together the respective tool and magazine housing members 240, 254 in a fashion similar to that described earlier with respect to the first embodiment of the fastening tool 10 and magazine 50.

Figure 17A:
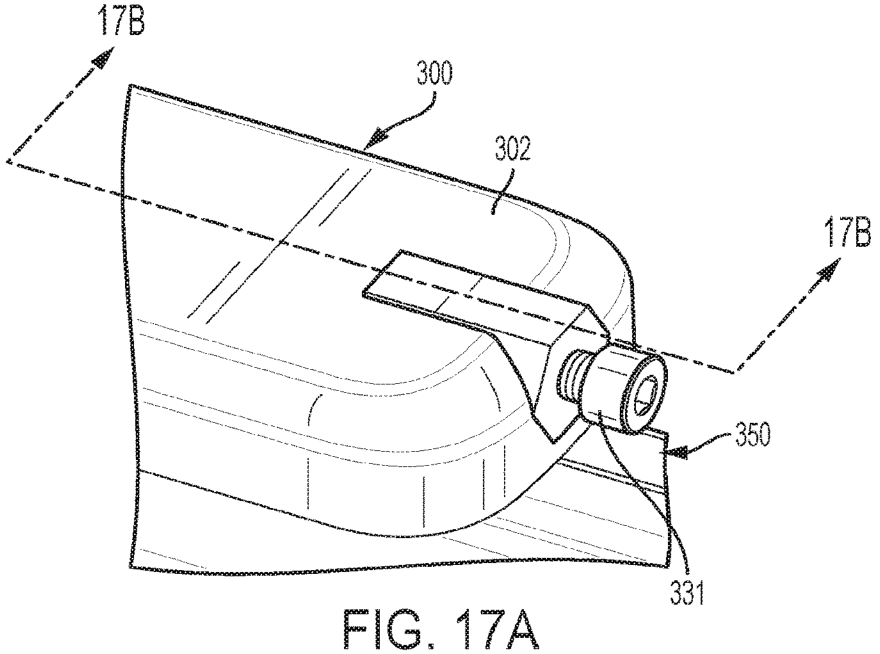
FIG. 17A is a partial perspective detail view of a fastening tool according to yet another embodiment of the present invention.
Figure 17B:
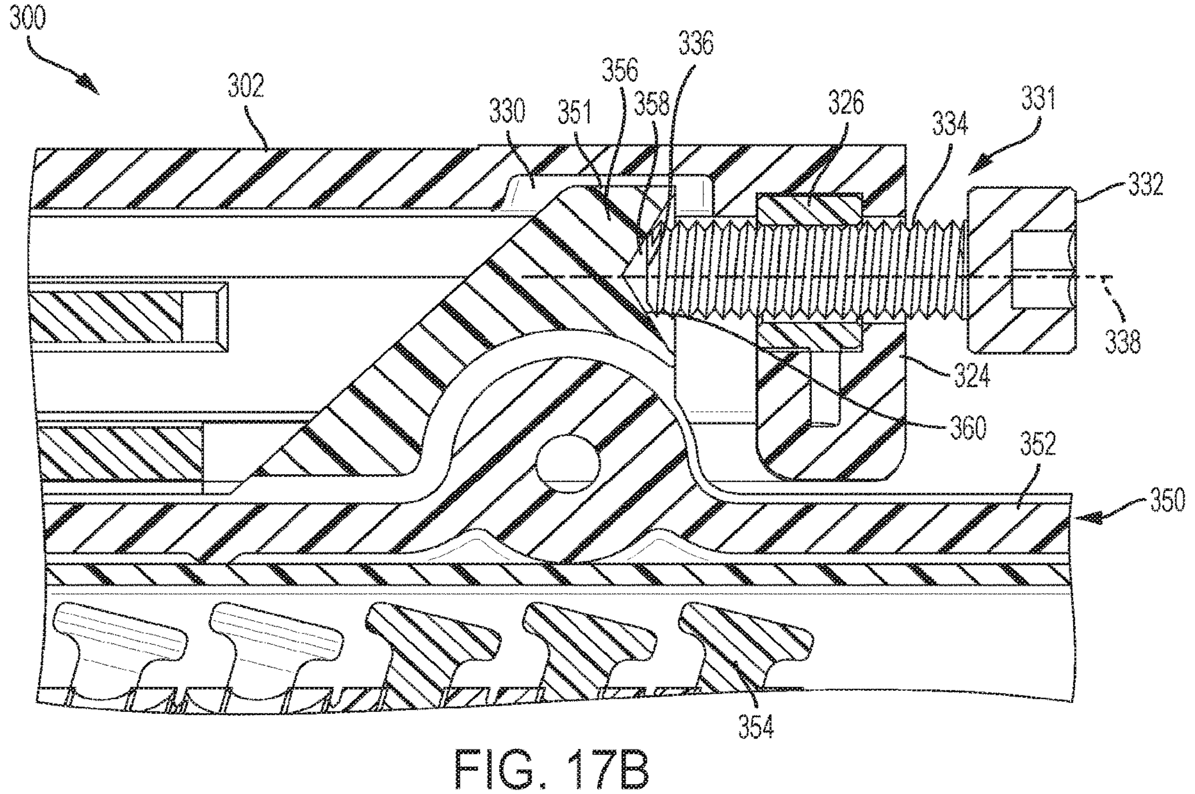
FIG. 17B is an elevational sectional detail view taken along line 17B-17B of FIG. 17A.

Referring now to FIGS. 17A and 17B, a third embodiment of the fastening tool 300 and magazine 350 of the present invention provides a simplified method for retaining the magazine on the fastening tool. Outside of the regions depicted in FIGS. 17A and 17B, all of the other elements of the fastening tool 300 and magazine 350 are the same as those described earlier with respect to the fastening tool 10 and magazine 50 of the present invention. In this embodiment, the fastening tool 300 includes a housing 302 that in turn defines a plurality of fastening tool housing members 324. The fastening tool 300 further includes a floating nut 326 threadedly engaged with a bolt 331 and disposed in a fastening tool housing member 324. The bolt 331 includes a head 332, threads 334 and a tip 336, all of which lie along an axis 338.

Magazine 350 includes magazine alignment surfaces 351 that cooperate with the fastening tool housing 302 and alignment surfaces 330 to retain the magazine properly oriented with the fastening tool 300. The magazine 350 also includes a magazine housing 352, a plurality of nails 354, and magazine housing members 356. One such magazine housing member 356 may include a bolt receptacle 358 defining a conical inner surface 360.

To retain the magazine 350 on the fastening tool 300, the magazine is first placed into alignment with the fastening tool, as was previously described, so that the bolt receptacle 358, bolt tip 336, and bolt head 332 are axially aligned along axis 338. Then the bolt 331 is threaded into engagement with the bolt receptacle 358, and is tightened in the floating nut 326. The geometry of the conical surface 360 of the bolt receptacle 358 cooperates with the tip 336 of the bolt 331 to compensate for variations in tolerances in the bolt receptacle, bolt, magazine 350 and fastening tool 300 as the bolt is tightened in the floating nut 326. For example, if the bolt 331 is slightly off-center with axis 338, the receptacle conical surface 360 ensures that the bolt nevertheless makes firm contact with the receptacle 358. It should be noted that, if desired, the locations of the respective retention components on the fastening tool 300 and magazine 350 may be reversed, for example, by mounting the bolt 331 and nut 332 on the magazine 350, and the bolt receptacle 358 on the fastening tool 300.

It can now be seen that two embodiments of the magazine 50, 250 of the present invention can be removably but securely retained on the fastening tool 10, 200 of the present invention by rotating a one-piece wedge or cam 80, 280, using a single motion in a single plane, as part of an over-center latch. Thus, the magazine retention system 25 of the present invention according to such two embodiments requires absolutely no tools, and provides a simple yet elegant solution to the problems previously embodied in conventional fastening tools.

While the present invention has been described with respect to various embodiments of a concrete nailer, the present invention may be further modified within the spirit and scope of this disclosure to apply to other products as well. This application is therefore intended to cover any variations, uses, or adaptations of the present invention using its general principles. Further, this application is intended to cover such departures from the present disclosure as come within known or customary practice in the art to which this invention pertains and which fall within the limitations of the appended claims.

What is claimed is:

1. A fastening tool, comprising:

a fastening tool housing having a fastening tool housing member and including a motor operatively associated with a fastener drive system;

a magazine having a magazine housing member and being releasably connected to the fastening tool housing, the magazine being configured to supply a plurality of fasteners to the fastener drive system;

a floating nut arranged on one of the fastening tool and magazine housing members, the floating nut being operatively associated with a bolt defining an axis;

a bolt receptacle arranged on the other of the fastening tool and magazine housing members, the bolt receptacle being operatively associated with the bolt by defining a conical surface against which the bolt engages, and being axially aligned with the bolt axis, wherein the magazine is releasably retained on the fastening tool when the bolt is threaded in the floating nut and is tightened against the bolt receptacle so that the bolt makes firm contact with the bolt receptacle.

2. A fastening tool, comprising:

a fastening tool housing having a fastening tool housing member and including a motor operatively associated with a fastener drive system;

a magazine having a magazine housing member and being releasably connected to the fastening tool housing, the magazine being configured to supply a plurality of fasteners to the fastener drive system;

a floating nut arranged on one of the fastening tool and magazine housing members, the floating nut being operatively associated with a bolt defining an axis;

a bolt receptacle arranged on the other of the fastening tool and magazine housing members, the bolt receptacle being operatively associated with the bolt, and being axially aligned with the bolt axis, wherein the magazine is releasably retained on the fastening tool when the bolt is threaded in the floating nut and is tightened against the bolt receptacle, wherein the floating nut is disposed in a portion of the fastening tool housing member, wherein the magazine housing member defines the bolt receptacle, wherein the bolt defines a bolt tip, and wherein the bolt receptacle defines a conical surface axially aligned with the bolt and the floating nut, so that when the bolt is tightened in the nut, the bolt tip engages the conical bolt receptacle, which engagement compensates for variations in tolerances in the floating nut, the bolt, the bolt receptacle and the fastening tool housing member, so that the bolt makes firm contact with the bolt receptacle.

3. A fastening tool, comprising:

a fastening tool housing having at least one fastening tool housing member and including a motor operatively associated with a fastener drive system;

a magazine having a magazine housing member and being releasably connected to the at least one fastening tool housing, the magazine being configured to supply a plurality of fasteners to the fastener drive system;

a bolt defining an axis;

a floating nut arranged on one of the at least one fastening tool and magazine housing members, the floating nut being operatively associated with the bolt;

a bolt receptacle arranged on the other of the at least one fastening tool and magazine housing members, the bolt receptacle being operatively associated with the bolt by defining a conical surface against which the bolt engages, and being axially aligned with the bolt axis, wherein the magazine is releasably retained on the fastening tool when the bolt is threaded in the floating nut and is tightened against the bolt receptacle, so that the bolt makes firm contact with the bolt receptacle.

4. A fastening tool, comprising:

a fastening tool housing having at least one fastening tool housing member and including a motor operatively associated with a fastener drive system;

a magazine having a magazine housing member and being releasably connected to the at least one fastening tool housing, the magazine being configured to supply a plurality of fasteners to the fastener drive system;

a bolt defining an axis;

a floating nut arranged on one of the at least one fastening tool and magazine housing members, the floating nut being operatively associated with the bolt;

a bolt receptacle arranged on the other of the at least one fastening tool and magazine housing members, the bolt receptacle being operatively associated with the bolt, and being axially aligned with the bolt axis, wherein the magazine is releasably retained on the fastening tool when the bolt is threaded in the floating nut and is tightened against the bolt receptacle, wherein the floating nut is disposed in a portion of the at least one fastening tool housing member, wherein the magazine housing member defines the bolt receptacle, wherein the bolt defines a bolt tip, and wherein the bolt receptacle defines a conical surface axially aligned with the bolt and the floating nut, so that when the bolt is tightened in the nut, the bolt tip engages the conical bolt receptacle, which engagement compensates for variations in tolerances in the floating nut, the bolt, the bolt receptacle and the at least one fastening tool housing member, so that the bolt makes firm contact with the bolt receptacle.

* * * * *